United States Patent [19]

Mendel

[11] Patent Number: 5,382,132
[45] Date of Patent: Jan. 17, 1995

[54] TOOTHED WHEEL GEAR UNIT FOR A COMPRESSOR SYSTEM

[75] Inventor: Jürgen Mendel, Senden, Germany

[73] Assignee: BHS-Voith Getriebetechnik GmbH, Sonthofen, Germany

[21] Appl. No.: 150,695

[22] Filed: Nov. 10, 1993

[30] Foreign Application Priority Data

Dec. 7, 1992 [DE] Germany .............. 4241141

[51] Int. Cl.⁶ .................................... F01D 13/00
[52] U.S. Cl. .............................. 415/60; 415/122.1; 417/423.6
[58] Field of Search ............. 415/122.1, 60, 99; 417/350, 423.6; 416/170 R

[56] References Cited

U.S. PATENT DOCUMENTS

| | | | |
|---|---|---|---|
| 1,435,821 | 11/1922 | Dorsey . | |
| 2,403,381 | 7/1946 | Lawrence | 415/122.1 |
| 3,001,692 | 9/1961 | Schierl | 415/122.1 |
| 5,154,571 | 10/1992 | Prumper | 415/60 |

FOREIGN PATENT DOCUMENTS

| | | |
|---|---|---|
| 245715 | 3/1966 | Austria . |
| 0440902 | 8/1991 | European Pat. Off. . |
| 1205150 | 1/1960 | France . |
| 2234490 | 1/1975 | France . |
| 1095700 | 12/1960 | Germany . |
| 2113594 | 10/1972 | Germany . |
| 2256681 | 6/1974 | Germany .......... 416/170 R |
| 7323092 | 6/1978 | Germany . |
| 3146160 | 9/1982 | Germany . |
| 4003482 | 8/1991 | Germany . |
| 9201858 | 4/1992 | Germany . |
| 4204338 | 11/1993 | Germany . |
| 267397 | 10/1989 | Japan ...................... 415/60 |

OTHER PUBLICATIONS

Dubbels Taschenbuch für den Maschinenbau, Springer Verlag, 1961; vol. 2, pp. 142–166.

MAN GHH product information, 4 pages unnumbered, undated.

*Primary Examiner*—Edward K. Look
*Assistant Examiner*—James A. Larson
*Attorney, Agent, or Firm*—Brumbaugh, Graves, Donohue & Raymond

[57] ABSTRACT

A toothed wheel gear unit for a compressor system includes a central wheel gear (5) which drives output shafts (9) connected with one or more compressors by way of pinions (7) on the output shafts (9). On at least one of the output shafts (9a) the pinion forms the sun gear of a planetary gear (15). The planet carrier (23) of the planetary gear (15) is held stationary, and the ring gear (17) of the planetary gear (15) has outer teeth (27) in engagement with the central wheel (5) and inner teeth meshing with the planet gears (21) rotatably supported on the planet-carrier (23).

25 Claims, 2 Drawing Sheets

TOOTHED WHEEL GEAR UNIT FOR A COMPRESSOR SYSTEM

BACKGROUND OF THE INVENTION

1. Field of the Invention

The invention relates to a compressor system having a toothed wheel gear inserted in the drive train between a drive unit and a compressor region of the system, the toothed wheel gear comprising a transmission housing, a transmission input shaft supported in the transmission housing, a main gearwheel near the input and at least one output shaft, with an axle, driven by way of a pinion and leading from the main gearwheel to the compressor region.

2. The Prior Art

Such a transmission/turbocompressor system has recently been required to attain pressure conditions of $P_A/P_E = 60$ and more, $P_E$ signifying the pressure in the compressor input and $P_A$ the pressure in the compressor output. This requires the transmission of great torques at medium speeds for compressor stages compressing at a low pressure level and very high speeds for compressor stages compressing at a higher pressure level. These very high speeds cannot be attained by single-stage transmissions alone. Therefore, the compressor units must be driven by a single-stage transmission in some stages and by a two-stage transmission in other compressor stages.

A transmission of the aforementioned type is disclosed in German Patent DE-C2 4,003,482. In this known device, a two-stage intermediate wheel, which is in engagement with the main gearwheel by a small-diameter annular gear and in engagement with a pinion of an output shaft by a large-diameter annular gear, is provided for the drive of a high-speed compressor unit.

Another device of the type referred to is disclosed in DE U 9,201,858. There, a triple gearwheel meshes with the main gearwheel near the input, specifically, with its axially central annular gear having a small number of teeth, while the two annular gears, located axially at the end and each having a greater number of teeth, are each in engagement with a pinion of an output shaft.

When, in these known devices, an output thrust is exerted on the output shaft of a compressor unit or, alternatively, of two compressor units mounted at the two ends of the output shaft, the resulting thrust can be transmitted by pressure plates to the crown gear meshing with the pinion. This is an advantageous accomplishment per se, because relatively small relative motions occur at the point of transmission between the pressure plates and a contact region of the crown gear near the teeth, so that comparatively low friction losses are to be expected there as compared with friction losses that would have to be expected if one wanted to support the output shaft by bearings transmitting axial thrust. As advantageous as this solution may be for the reasons indicated above, however, a certain problem nevertheless remains, inasmuch as resulting axial thrust, which is transmitted by a pressure plate to a crown gear inserted before the pinion, leads to a tilting moment on the wheel members belonging to the crown gear, which may give rise to improper positions that are hard to control.

An additional disadvantage of the known prior art devices consists in that double or triple wheels increase the width of the housing. Hence the "bending length" of the output shafts provided with pinions is also increased, which may lead to uncontrollable vibrations.

Another disadvantage of the known devices is that the housing, which should be designed for compactness and rigidity, becomes larger and therefore requires additional stiffening measures. Due to the increase in size and the addition of stiffening means, the transmission housing becomes increasingly larger and harder to handle.

SUMMARY OF THE INVENTION

It is therefore an object of the invention to provide, while avoiding the disadvantages of the prior art indicated above, a toothed wheel gear unit for a compressor system of the type referred to in such a way that tilting stresses on the gearwheels are reduced and housing dimensions can be kept as small as possible. In addition, the possibility of being able to utilize known housing shapes which have been used for lower speed requirements and are available on a mass-produced basis is to be retained.

In addition, the possibility of being able to incorporate, in one and the same unit, a transmission housing and/or shafts for medium speeds and very high speeds is to be retained.

To accomplish these objects, in accordance with the invention, it is proposed to provide a toothed wheel gear unit in which: the pinion driving the output shaft is constituted by the sun gear of a planetary gear; a planet carrier of the planetary gear is fixed on the transmission housing; a ring gear of the planetary gear is rotatably supported on a bearing part that is stationary with respect to the transmission housing, and has outer teeth in engagement with the main gearwheel near the input; at least one planet gear is supported on the planet carrier and is in toothed engagement with inner teeth of the ring gear as well as with outer teeth of the sun gear; the sun gear or/and the output shaft is/are axially fixed by at least one pressure plate acting in axial direction on the planet gear(s); and the planet gear(s) is supported in axial direction on the planet carrier by a bearing arrangement which transmits force axially.

The toothed gear unit according to the invention affords substantial advantages relative to the prior art. For instance, substantially greater output speeds can be obtained. Thus, for example, a translation ratio $i_{ges}$ of 23.5 between the speed of the input shaft $N_E$ and the speed of the output shaft $N_A$ can be obtained without any problem, which, on the assumption of an input shaft speed of 2,980 rpm, leads to a speed of the output shaft $N_A$ of 70,000 rpm. At the same time the axial distance between the axis of the main gearwheel and the axis of the output shaft can be kept quite small, e.g., to about 559 mm.

Also, the resulting axial thrust on the output shaft is transmitted by at least one, but preferably by two, pressure plates to one or more, preferably three, planet gears that are uniformly spaced about the axis of the output shaft. The effect of low friction between the pressure plate(s) of the output shaft and the adjacent contact regions of the planet gears is also a factor here. However, the advantage that only relatively small tilting moments are transmitted to the wheel members of the planet gears, since the planet gears have only a relatively small radius, also enters in. The axial thrust from the relatively slow-running planet gears can then be transmitted relatively simply to the planet carrier by an axial force-transmitting bearing, e.g., a grooved ball bearing. The greater the number of planet gears arranged circumferentially, the less problematic this is. Added to this is the fact that the bearings of the planet gears loaded by transmission of thrust force have relatively small diameters to match the planet gear bearing journals, so that the peripheral speeds in these bearings are relatively low.

In another embodiment of the invention, it is proposed that the pressure plate(s) engages the planet gear(s) in radial vicinity to the pitch circle of the teeth of the planet gear(s). This measure, as already indicated, produces the lowest possible relative speeds at the points of contact between the pressure plate(s) and the planet gear(s).

According to a preferred embodiment of the invention, the output shaft is supported by an output shaft bearing unit in a bearing opening of a side wall of the transmission housing. The output shaft bearing unit preferably includes an outer bearing part fixed on the transmission housing in both the axial direction and the circumferential direction. If it is imagined that a transmission housing which was originally designed for direct engagement of the pinion with a central gear is available, an output shaft bearing unit, at which all bearing functions for the planetary gear can be provided, can accordingly be provided in a housing wall of this transmission housing with the use of the bore diagram that was intended for the bearing of such an output shaft with pinion directly engaging the main gear. This makes new boring of the transmission housing unnecessary.

If it is in addition assumed that the output shaft upon incorporation of the planetary gear becomes smaller in diameter than the output shaft upon direct engagement of the pinion with the main gearwheel, the output shaft bearing unit can readily accommodate the diameter of the slimmer output shaft. It should also be noted here that the slimmer design of the output shaft upon insertion of the planetary gear is not only required for structural reasons, but is also acceptable with respect to function, since owing to insertion of the planetary gear the output speed can be increased and therefore a required output can be transmitted with a small output shaft cross section.

The output shaft bearing unit is advantageously designed as a slide bearing. Slide bearings are especially suited to withstanding very high speeds. As already indicated above, the outer bearing part may alternatively provide bearing functions for the planetary gear, such as where the planet carrier is fastened to the outer bearing part of the output shaft bearing unit. It may then additionally be provided that the ring gear is supported on the planet carrier.

In regard to favorable torque-transmission conditions and quiet operation, it is recommended that the outer teeth of the ring gear be designed as a plain helical gear. Then axial support of the ring gear must be taken care of and this can be accomplished by supporting the ring gear, at at least one of its axial ends, on the planet carrier by an axial force-transmitting ball bearing, e.g., an angular ball bearing.

In a particularly advantageous embodiment of the invention, in terms of assembly and the space required, the outer bearing part of the output shaft bearing unit is designed with a support ring resting on the inside of the housing wall in the peripheral region of the bearing opening, a carrier neck of the planet carrier is fastened on this support ring in a radially inner region thereof, the carrier neck of the planet carrier, at an end near the planet gear, is designed with a planet carrier flange directed radially outward, and a ring gear carrier flange, directed radially inward, is supported in axial direction between the planet carrier flange and the support ring on the neck of the planet carrier.

The axial forces introduced by the output shaft onto the planet gear(s) may be favorably transmitted from the latter to the planet carrier by supporting the planet gear(s) on the planet carrier by an axial force-transmitting bearing, e.g., a grooved ball bearing.

To facilitate producing the teeth on the ring gear and for incorporation of the planetary gear in the transmission housing, the ring gear is preferably made of an outer ring having outer teeth and inner teeth and a ring gear carrier flange detachably fastened on the outer ring, with the ring gear carrier flange being fastened to at least one axial end of the outer ring.

To facilitate production of the sun gear and the planet gear(s), it is advantageous and inexpensive to design the sun gear and the planet gear(s) with straight teeth. These straight teeth are especially preferred when the planet gear(s) is made of synthetic material.

At the inner teeth of the ring gear, which is in engagement with the planet gear(s), just as at the point of engagement between planet gear(s) and the sun gear, a smaller torque is transmitted than at the point of engagement between the outer teeth of the ring gear and the main gearwheel. The tooth width requirement is therefore smaller on the inside of the ring gear than the tooth width requirement at the outside of the ring gear. Thus inner teeth of the ring gear have an axial width which is smaller than the axial width of the main gearwheel, and at least part of the axial width of the planet carrier may be accommodated within the axial width of the main gearwheel. In this way, the total axial width requirement of the planetary gear does not substantially exceed the existing space requirement of a pinion used for direct transmission of torque from the main gearwheel to the output shaft, thus confirming the assumption that, without adversely affecting favorable assembly conditions and without other undesirable compromises, a planetary gear transmission can be introduced between the main gearwheel and the output shaft in an existing transmission housing originally designed for direct engagement between the main gearwheel and the output shaft.

As is well known per se in compressor systems of the type considered here with direct transmission of torque between the main gearwheel and the pinion of an output shaft, it is advantageous when the planetary gear and its bearings are accommodated, substantially symmetrical to a plane of symmetry orthogonal with reference to the axis of the output shaft, between two housing walls of the transmission housing.

As is likewise disclosed in the prior art, for example according to the figure of DE C2 4,003,482, a design may be selected wherein the output shaft is carried through two facing housing walls of the transmission housing. The output shaft may then carry, at one or at both ends, the rotor of a compressor, e.g., a turbocompressor or a screw-type compressor. In the case of the arrangement of a compressor at each end, care must be taken, by suitable adjustment of thrust force, that the output shaft is loaded only by a small resulting axial thrust and accordingly only a small axial force must be transmitted between the pressure plates of the output shaft and the planet gear(s).

As is disclosed in DE C2 4,003,482, the main gearwheel may be arranged as a central wheel in the compressor housing and the bearings for a plurality of output shafts distributed about the axis of the central wheel may be provided in the transmission housing. In accordance with the invention, an output shaft which is in direct engagement by its pinion with the central wheel may then be inserted in one or more of the bearings and, at the same time, an output shaft which is driven by the central wheel by way of an associated planetary gear as described herein may be inserted in one or more of the other bearings. At the same time, care must be taken—provided that the respective output shafts are equipped with a compressor at either end—to offset axial thrusts as much as possible on one and the same output shaft. This can be obtained in particular by assigning one and the same output shaft to two identical compressors connected in parallel and therefore also uniformly impacted. However, two adjacent compressor units in a multistage circuit compressor arrangement may alternatively be placed on one and the same output shaft. The main gearwheel be mounted, fixed against rotation, on the input shaft and by way of the latter be connected with, for instance, an electric motor or with a piston-type internal-combustion engine or with a gas or steam turbine. If a gas turbine is selected as the drive unit, it is alternatively conceivable to undertake a translation into slow speed from this gas turbine to the central gear, i.e., to couple the gas turbine to the peripheral teeth of the central gear via a small-diameter driving pinion.

The design of the compressor unit according to the invention is particularly suitable for compressing process media of the chemical industry in the broadest sense, the chemical industry in this case also including the oil-refining industry, the food and tobacco-processing industries and the like. High degrees of compression are required in these industries. The compressor units driven by the individual output shafts may be circuited as desired, at least some of the compressor units frequently being arranged in series in order to bring the process medium up to the required pressure gradually. Nor should it be ruled out that one or a plurality of compressor stages in the high pressure-level range may be driven independently of the toothed wheel gear, for example by an exhaust gas turbine which can be driven by an available source of exhaust gas. It is possible to drive at least one compressor unit by a turbine which in turn is driven by a precompressed portion of the process medium in a compressor stage of medium pressure level driven by way of the toothed wheel gear unit of the invention.

BRIEF DESCRIPTION OF THE DRAWINGS

For a better understanding of the invention, reference may be made to the following description of an exemplary embodiment thereof, taken in conjunction with the accompanying drawings in which.

DETAILED DESCRIPTION

Figure 1:
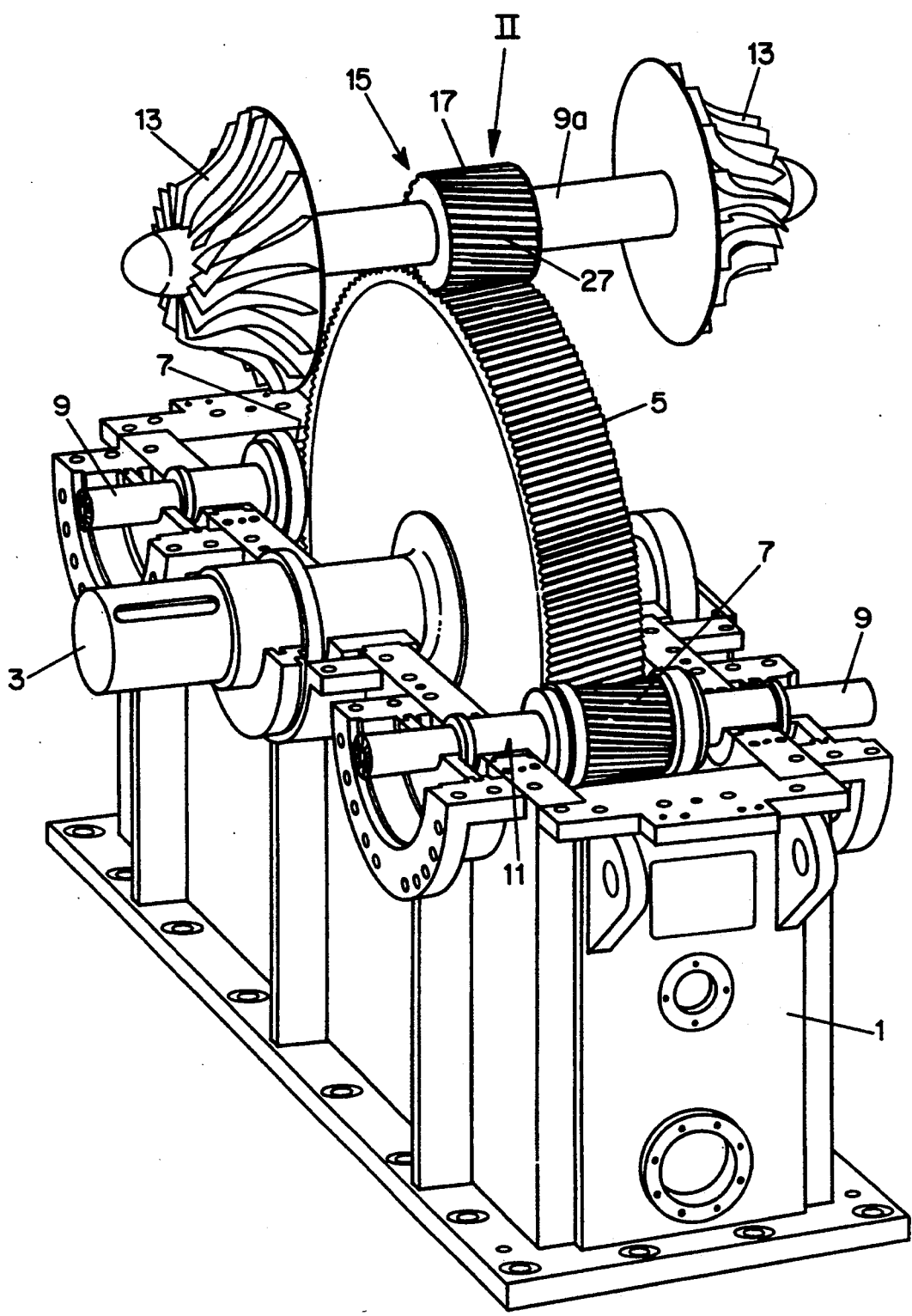
FIG. 1 is a partial perspective view of a compressor system embodying a toothed wheel gear unit according to the invention.

In the toothed wheel gear unit shown in FIG. 1, a main gearwheel 5, connected for rotation with a transmission input shaft 3, is supported in the lower part of a transmission housing 1. The main gearwheel 5 drives a plurality of pinions 7, likewise supported in the compressor housing 1. Output shafts 9, connected for rotation with the pinions 7, extend through bearing openings 11 of the housing 1 beyond the housing walls and may, as shown at the uppermost pinion shaft 9a, carry compressor rotors 13 at either or both ends. The pinion (not shown in FIG. 1) driving the output shaft 9a lying at the top in FIG. 1 is the sun wheel of a planetary gear 15 (shown in detail in FIG. 2), whose ring gear 17 has outer teeth which mesh with the main gearwheel 5, designed as the central wheel, for the purpose of driving the output shaft 9a.

Figure 2:
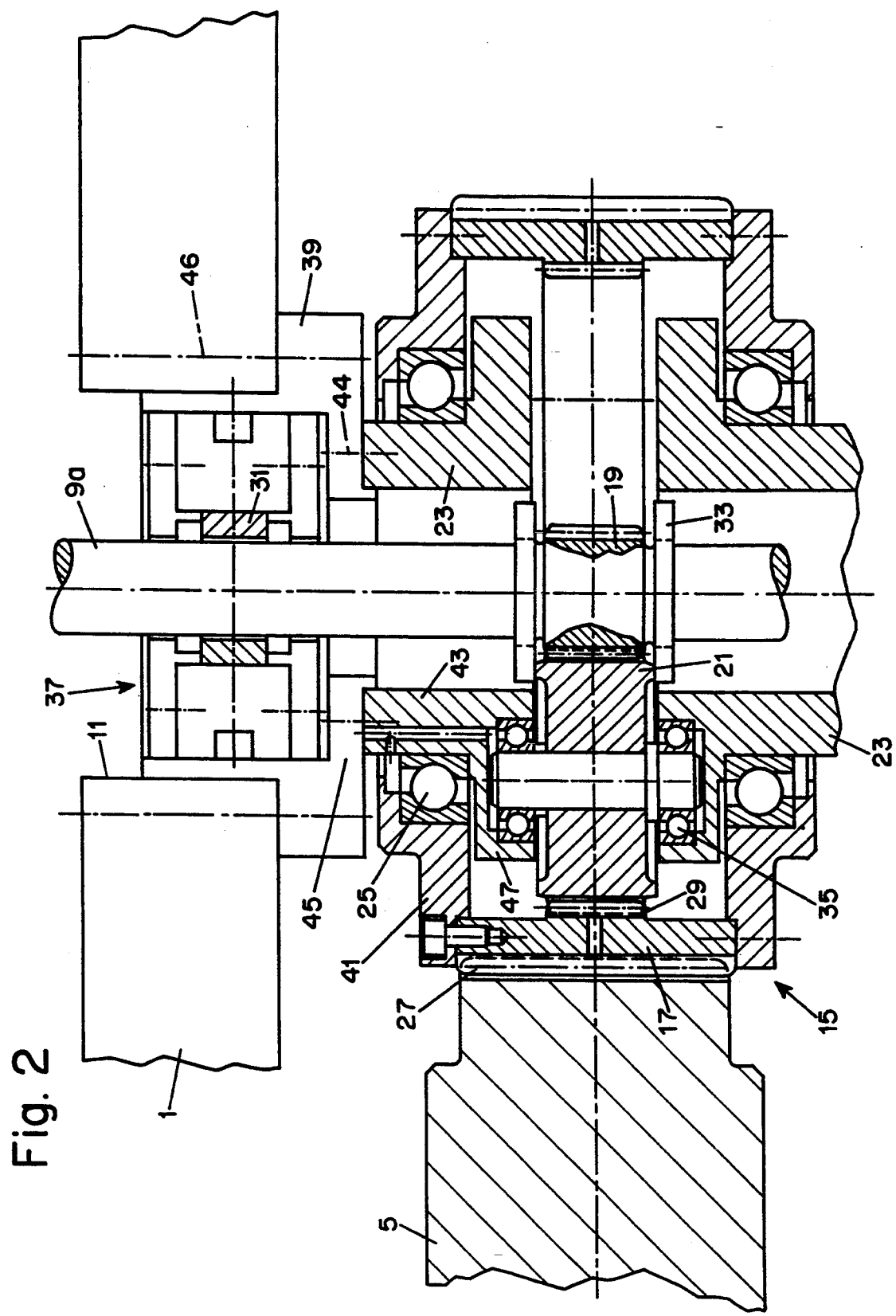
FIG. 2 is a sectional view of a planetary gear adapted for insertion between the pinion and the central gearwheel at the position II of FIG. 1.

In FIG. 2, the planetary gear 15, together with part of the main gearwheel 5 and the transmission housing 1, is represented in section. The output shaft 9a is connected for rotation with a sun gear 19 and extends through the bearing opening 11 of the housing 1 to the outside. As shown in FIG. 2, the sun gear 19 meshes with one or more planet gears 21 (only one of which is shown) which are rotatably supported on a planet carrier 23, which is stationary relative to the housing 1. The planet gears 21 transmit the rotation of the ring gear 17, driven by the main gearwheel 5, to the sun gear 19. The ring gear 17 is rotatably supported on the planet carrier 23 and is axially fixed thereon by means of an angular ball bearing 25. The ring gear 17 has helical outer teeth 27, for engagement with the helical teeth of the main gearwheel 5, as well as, on its inner periphery, inner teeth 29 for meshing with the planet gears 21. The inner teeth 29 are preferably straight.

The planetary gear 15 shown in this embodiment has a translation ratio of 23.5 between the speed of the main gearwheel 5 and the speed of the output shaft 9a. At a main gearwheel speed of 2,980 rpm, this corresponds with an output shaft speed of 70,000 rpm with a speed of the ring gear 17 of 13,708 rpm and a speed of the planet gears 21 of 34,000 rpm. At such a high output shaft speed, keeping the diameter of the sun gear output shaft 9a small is not only a design necessity for accommodation of the planetary gear 15, but is also highly desirable. The friction losses appearing in an oil film slide bearing 31 supporting the shaft 9a can be kept relatively low because the rotational speed of the output shaft 9a is proportional to the diameter thereof. Hence, the smaller the diameter of shaft 9a, the lower the relative speed between the shaft surface and the facing bearing surfaces.

The resulting axial thrust of the compressor on the output shaft 9a, deriving from the compressor rotors 13, is transmitted to the planet gears 21 by way of pressure plates 33 fixedly mounted on the output shaft 9a. Because of the axial force-transmitting bearing arrangement formed by a grooved ball bearing 35 interposed between the planet gears 21 and the planet carrier 23, this axial compressor thrust is transmitted to the planet carrier 23 and thence ultimately to the transmission housing 1, which is firmly connected with the planet carrier 23.

In the case of the output shaft pinions 7 (which mesh directly with the main gearwheel 5 by pressure plate as shown in FIG. 1), on the other hand, the resulting axial thrust of the compressor is transmitted to the main gearwheel 5.

Since the bearing 31 of the planetary gear output shaft 9a is arranged in an output shaft bearing unit 37 adapted to the conventional dimensions of the bearing opening 11, costly redesign of the housing 1 is avoided.

The output shaft bearing unit 37 has an outer bearing part 39, which produces the firm connection between the transmission housing 1 and the planet carrier 23.

As the torques transmitted within the planetary gear 15 are substantially smaller than the torques transmitted from the main gearwheel 5 to the outer teeth of the ring gear 17, the axial width of the inside teeth of the planetary gear 15 may be smaller than the axial width of the main gearwheel 5. For this reason, the planetary gear 15 may be especially compact and thus be incorporated into housings having a relatively small width. Such relatively narrow housings are especially advantageous with regard to bending vibrations of the shafts 9, 9a supported in the housing walls.

The ring gear 17 is supported by a ring gear carrier flange 41, which extends radially inwardly towards the sun gear shaft 9a and projects only slightly beyond the central wheel 5 in the axial direction. The ring gear carrier flange 41 is rotatably mounted on a carrier neck 43 of the planet carrier 23 by the angular ball bearings 25. In the axial direction, the ring gear carrier flange 41 lies between a support ring 45 of the outer bearing part 39 and a planet carrier flange 47. The planet carrier flange 47 carries the planet gears 21 via bearings 35 and is arranged inside the axial width of the main gearwheel 5.

The carrier neck 43 of the planet carrier 23 is fastened by means of screws (indicated schematically at 44) to the support ring 45 of the output shaft bearing unit 37, and the support ring 45 is fastened by screws (indicated schematically at 46) to the housing 1.

The outer bearing part 39 of the output shaft bearing unit 37 and the planet carrier 23, as well as the ring gear carrier flange 41, may be produced by pressure diecasting, which proves to be especially favorable with regard to the production of complicated shapes, oil supply channels, etc.

Preferably, three planet gears 21 are spaced uniformly about the sun wheel shaft 9a in the circumferential direction to balance the radial forces transmitted via the planet gears 21 to the sun gear shaft 9a. These planet wheels 21 may be made of synthetic material.

A compressor system incorporating a toothed wheel gear unit according to the invention offers, in a compact design, very high translation ratios and hence permits very high output pressures of a medium compressed in the system.

Although the invention has been described and illustrated by reference to a specific embodiment thereof, it will be understood that the embodiment is susceptible of modification and variation without departing from the inventive concepts disclosed. All such modifications and variations, therefore, are intended to be included within the spirit and scope of the appended claims.

I claim:

1. A toothed wheel gear unit for a compressor system having said toothed wheel gear unit inserted in a drive train between a drive unit and a compressor region of the system, said toothed wheel gear unit comprising a transmission housing (1), a transmission input shaft (3) supported in the transmission housing (1), a main gearwheel (5) near the input shaft and drivingly coupled to the input shaft (3), and at least one output shaft (9, 9a) driven by a pinion (7, 19) mounted thereon and leading from the main gearwheel (5) to the compressor region, wherein the improvement comprises:

the pinion driving at least one output shaft (9a) comprises an externally-toothed sun gear (19) of a planetary gear (15);

the planetary gear (15) including a planet carrier (23) fixed on the transmission housing (1);

the planetary gear (15) further including a ring gear (17) rotatably supported on a bearing part (43) that is stationary with respect to the transmission housing (1), the ring gear (17) having inner and outer teeth (29, 27);

the outer teeth of the ring gear (17) being in engagement with the main gearwheel (5);

at least one planet gear (21) being rotatably supported on the planet carrier (23) in toothed engagement with the inner teeth (29) of the ring gear (17) and with the teeth of the sun gear (19);

at least one of the sun gear (19) and said at least one output shaft (9a) being fixed in the axial direction by at least one pressure plate (33) acting on the at least one planet gear (21); and said at least one planet gear (21) being supported in the axial direction on the planet carrier (23) by an axial force-transmitting bearing arrangement (35).

2. The toothed wheel gear unit according to claim 1, wherein said at least one pressure plate (33) engages said at least one planet gear (21) in radial vicinity to the pitch circle of the teeth of the planet gear (21).

3. The toothed wheel gear unit according to claim 1 or 2, wherein said at least one output shaft (9a) is supported by an output shaft bearing unit (37) in a bearing opening (11) of a side wall of the transmission housing (1), said output shaft bearing unit (37) comprising an outer bearing part (39) fixed on the transmission housing (1) in both the axial and circumferential directions.

4. The toothed wheel gear unit according to claim 3, wherein the bearing opening (11) is oversized with respect to the diameter of said at least one output shaft (9a), the output shaft bearing unit (37) being dimensioned to compensate for said oversizing.

5. The toothed wheel gear unit according to claim 3, wherein the output shaft bearing unit (37) comprises a sliding bearing (31).

6. The toothed wheel gear unit according to claim 5, wherein the sliding bearing (31) comprises an oil-film bearing.

7. The toothed wheel gear unit according to claim 3, wherein the planet carrier (23) is fastened to the outer bearing part (39) of the output shaft bearing unit (37).

8. The toothed wheel gear unit according to claim 7, wherein the bearing part (43) supporting the ring gear (17) is part of the planet carrier (23).

9. The toothed wheel gear unit according to claim 8, wherein the outer teeth (27) of the ring gear (17) comprise plain helical teeth, and the ring gear (17) is supported, at at least one axial end thereof, on the planet carrier (23) by a first axial force-transmitting bearing.

10. The toothed wheel gear unit according to claim 9, wherein the first axial force-transmitting bearing comprises an angular ball bearing (25).

11. The toothed wheel gear unit according to claim 3, wherein said at least one planet gear (21) is supported on the planet carrier (23) by at least one second axial force-transmitting bearing.

12. The toothed wheel gear unit according to claim 11, wherein the second axial force-transmitting bearing comprises a grooved ball bearing (35).

13. The toothed wheel gear unit according to claim 3, wherein the outer bearing part (39) of the output shaft bearing unit (37) includes a support ring (45) resting on the inside of the housing wall (1) in the peripheral region of the bearing opening (11), said bearing part comprises a carrier neck (43) of the planet carrier (23) fastened to the support ring (45) in a radially inner region thereof, the carrier neck (43) of the planet carrier (23), at an end near said at least one planet gear (21), includes a planet carrier flange (47) extending radially outward, and a ring gear carrier flange (41), connected to the ring gear (17) and extending radially inward, is rotatably supported on the carrier neck (43) of the planet carrier (23) between the planet carrier flange (47) and the support ring (45).

14. The toothed wheel gear unit according to claim 3, further comprising a ring gear carrier flange (41) fastened detachably to the ring gear (17) at least at one axial end of the ring gear.

15. The toothed wheel gear unit according to claim 1, wherein the teeth of the sun gear (19) and said at least one planet gear (21) are straight teeth.

16. The toothed wheel gear unit according to claim 1, wherein said at least one planet gear (21) is made of synthetic material.

17. The toothed wheel gear unit according to claim 1, wherein the inner teeth (29) of the ring gear (17) have an axial width which is smaller than the axial width of the main gearwheel (5), and at least part of the axial width of the planet carrier (23) is accommodated within the axial width of the main gearwheel (5).

18. The toothed wheel gear unit according to claim 1, wherein the planetary gear (15) and the output shaft bearing units (37) thereof are accommodated, substantially symmetrical to a plane of symmetry orthogonal with reference to the axis of the output shaft, between two housing walls of the transmission housing (1).

19. The tooth wheel gear unit according to claim 18, wherein said at least one output shaft (9a) is carried through two facing housing walls of the transmission housing.

20. The tooth wheel gear unit according to claim 1, wherein said at least one output shaft (9a) carries, at at least one end, the rotor (13) of a compressor.

21. The tooth wheel gear unit according to claim 20, wherein the compressor comprises a turbocompressor or screw-type compressor.

22. The tooth wheel gear unit according to claim 1, wherein said at least one output shaft has two ends, and wherein a pair of compressor units (13) are connected with the two ends of said at least one output shaft (9a) so that axial thrusts transmitted by said two compressor units (13) to said at least one output shaft (9a) are at least partially offset.

23. The tooth wheel gear unit according to claim 1, wherein the main gearwheel (5) is arranged as a central wheel in the transmission housing (1), and bearings (11) for a plurality of output shafts (9, 9a) are circumferentially distributed about the axis of the central wheel (5) and mounted in the transmission housing (1).

24. The tooth wheel gear unit according to claim 23, wherein an output shaft (9), having an associated pinion (7) in direct toothed engagement with the main gearwheel (5), is supported in at least one of the bearings (11).

25. The tooth wheel gear unit according to claim 1, wherein the main gearwheel (5) is connected in a rotationally fixed manner to the input shaft (3).

* * * * *